(12) United States Patent
Shoda

(10) Patent No.: US 7,954,364 B2
(45) Date of Patent: Jun. 7, 2011

(54) MALFUNCTION DIAGNOSIS APPARATUS FOR EXHAUST GAS SENSOR AND METHOD FOR DIAGNOSIS

(75) Inventor: Hirofumi Shoda, Toyota (JP)

(73) Assignee: Denso Corporation, Kariya (JP)

( * ) Notice: Subject to any disclaimer, the term of this patent is extended or adjusted under 35 U.S.C. 154(b) by 316 days.

(21) Appl. No.: 12/365,302

(22) Filed: Feb. 4, 2009

(65) Prior Publication Data

US 2009/0229355 A1 Sep. 17, 2009

(30) Foreign Application Priority Data

Mar. 17, 2008 (JP) ................................. 2008-068578

(51) Int. Cl.
*G01M 15/10* (2006.01)
(52) U.S. Cl. .................................. 73/114.69; 73/114.77
(58) Field of Classification Search ............... 73/114.69, 73/114.71, 114.72, 114.73, 114.77
See application file for complete search history.

(56) References Cited

U.S. PATENT DOCUMENTS

| 6,374,818 B2 | 4/2002 | Shinjyo et al. |
| 6,976,382 B2 * | 12/2005 | Kadowaki et al. ............. 73/1.06 |
| 7,387,011 B2 * | 6/2008 | Fujiki et al. .................. 73/23.32 |
| 2003/0097873 A1 * | 5/2003 | Surnilla ....................... 73/118.1 |
| 2003/0154709 A1 * | 8/2003 | Kadowaki et al. ............. 60/276 |

* cited by examiner

*Primary Examiner* — Eric S McCall
(74) *Attorney, Agent, or Firm* — Nixon & Vanderhye PC

(57) ABSTRACT

A malfunction diagnosis apparatus diagnoses a malfunction of an exhaust gas sensor provided on a downstream side of a catalyst. A dead time determination unit determines a dead time between a first time point, at which fuel cut of the internal combustion engine is started, and a second time point, at which the fuel cut starts exerting effect on an output of the exhaust gas sensor. An output change time measurement unit measures an output change time between the first time point and a third time point, at which the output of the exhaust gas sensor changes to a leaner side than a threshold. A malfunction determination unit determines whether a malfunction is caused in the exhaust gas sensor on the basis of a response time of the exhaust gas sensor obtained by subtracting the dead time from the output change time.

12 Claims, 4 Drawing Sheets

MALFUNCTION DIAGNOSIS APPARATUS FOR EXHAUST GAS SENSOR AND METHOD FOR DIAGNOSIS

CROSS REFERENCE TO RELATED APPLICATIONS

This application is based on and incorporates herein by reference Japanese Patent Application No. 2008-68578 filed on Mar. 17, 2008.

FIELD OF THE INVENTION

The present invention relates to a malfunction diagnosis apparatus for an exhaust gas sensor for performing a malfunction diagnosis of an exhaust gas sensor provided on the downstream side of a catalyst for purifying the exhaust gas of an internal combustion engine. The present invention relates to a method for diagnosing the exhaust gas sensor.

BACKGROUND OF THE INVENTION

In recent years, an internal combustion engine for a vehicle is provided with an exhaust gas purifying system. The exhaust gas purifying system includes a catalyst, which is for purifying exhaust gas in an exhaust pipe, and exhaust gas sensors such as an air-fuel ratio sensor or an oxygen sensor for detecting an air-fuel ratio or a rich-lean state of exhaust gas. The exhaust gas sensors are provided respectively on the upstream side and on the downstream side of the catalyst. The air-fuel ratio is feedback controlled on the basis of the outputs of the exhaust gas sensors so as to enhance efficiency of purification of exhaust gas by using the catalyst.

In such an exhaust gas purifying system, the exhaust gas sensors need a malfunction diagnosis so as to avoid continuous operation of the system in a state where the exhaust gas sensors are deteriorated to decrease in accuracy of the air-fuel ratio control and to decrease in efficiency of purification of the exhaust gas. Generally, the output of an exhaust gas sensor (catalyst downstream sensor) provided on the downstream side of a catalyst is exerted with an effect of the quantity of oxygen as the quantity of lean component that the catalyst adsorbs. Therefore, the output of the exhaust gas sensor tends to delay with respect to a change in an air-fuel ratio on the upstream side of the catalyst.

In consideration of the foregoing characteristics, U.S. Pat. No. 6,374,818 B2 (JP-A-2001-215205) proposes an apparatus configured to determine a malfunction of a catalyst downstream sensor during a fuel cut of an internal combustion engine or after the fuel cut, i.e., after starting of fuel injection. In the present apparatus, when a predetermined time elapses after starting the fuel cut (fuel cut start), it is determined whether the catalyst downstream sensor is normal on the basis of determination whether the output of the catalyst downstream sensor becomes leaner than a threshold. In the case where the determination of malfunction of the catalyst downstream sensor is not performed during the fuel cut, thereafter, it is determined whether the catalyst downstream sensor is normal on the basis of determination whether the output of the catalyst downstream sensor becomes richer than a threshold after a predetermined time subsequent to the fuel cut. At this time, if a summation of the quantity of exhaust gas after the fuel cut is smaller than a predetermined value, the determination of malfunction of the catalyst downstream sensor is suspended even when the output of the catalyst downstream sensor is leaner than the threshold after the predetermined time subsequent to the fuel cut. The present operation avoids erroneous determination of malfunction of the catalyst downstream sensor in the state where change in air-fuel ratio of the exhaust gas on the downstream side of the catalyst is delayed due to decrease in summation of exhaust gas subsequent to the fuel cut. That is, erroneous determination can be avoided even when the quantity of exhaust gas as a rich component decreases, and thereby change in air-fuel ratio delays to cause change in output of the catalyst downstream sensor.

However, the time between the fuel cut start and change in output of the catalyst downstream sensor includes a dead time. Accordingly, in U.S. Pat. No. 6,374,818, the responsivity of the catalyst downstream sensor cannot be evaluated with high accuracy. Consequently, reduction in responsivity of the catalyst downstream sensor cannot be detected with high accuracy.

SUMMARY OF THE INVENTION

In view of the foregoing and other problems, it is an object of the present invention to produce a malfunction diagnosis apparatus for an exhaust gas sensor, the malfunction diagnosis apparatus being capable of determining a responsivity of a catalyst downstream sensor with high accuracy and capable of detecting reduction in detection accuracy of the catalyst downstream sensor with high accuracy. It is another object of the present invention to produce a method for diagnosing the exhaust gas sensor.

The present inventor has conducted research on a system for detecting an output change time between the fuel cut start and change in output of a catalyst downstream sensor to be leaner than a predetermined value. The system further compares the detected output change time with a malfunction determination value to determine whether the catalyst downstream sensor causes a malfunction, i.e., reduction in responsivity. In the process of the research, the present inventor found the following new problem.

In recent years, increase in detection accuracy of reduction in responsivity of the catalyst downstream sensor has been demanded. However, the output change time includes the dead time between the fuel cut start and change in output of the catalyst downstream sensor. The present dead time varies according to the state of deterioration of the catalyst, which relates to the quantity of oxygen that the catalyst can adsorb, or an exhaust gas flow rate. Accordingly, the output change time is easily changed. Thus, the responsivity of the catalyst downstream sensor cannot be conventionally evaluated with high accuracy, and hence the demand to increase detection accuracy of reduction in responsivity of the catalyst downstream sensor cannot be satisfied.

In view of the foregoing, according to one aspect of the present invention, a malfunction diagnosis apparatus for performing a malfunction diagnosis of an exhaust gas sensor, which is for detecting at least one of an air-fuel ratio and a rich-lean state and provided on a downstream side of a catalyst, which is for purifying exhaust gas of an internal combustion engine, the malfunction diagnosis apparatus comprises dead time determination means for determining a dead time between a first time point, at which fuel cut of the internal combustion engine is started, and a second time point, at which the fuel cut starts exerting effect on an output of the exhaust gas sensor. The malfunction diagnosis apparatus further comprises output change time measurement means for measuring an output change time between the first time point and a third time point, at which the output of the exhaust gas sensor changes to a leaner side than a threshold. The malfunction diagnosis apparatus further comprises malfunction determination means for determining whether a malfunction is caused in the exhaust gas sensor on the basis of a response time of the exhaust gas sensor obtained by subtracting the dead time from the output change time.

According to another aspect of the present invention, a method for a malfunction diagnosis of an exhaust gas sensor, which is for detecting at least one of an air-fuel ratio and a rich-lean state and provided on a downstream side of a catalyst, which is for purifying exhaust gas of an internal combustion engine, the method comprises first determining a dead time between a first time point, at which fuel cut of the internal combustion engine is started, and a second time point, at which the fuel cut starts exerting effect on an output of the exhaust gas sensor. The method further comprises measuring an output change time between the first time point and a third time point, at which the output of the exhaust gas sensor changes to a leaner side than a threshold. The method further comprises second determining whether a malfunction is caused in the exhaust gas sensor on the basis of a response time of the exhaust gas sensor obtained by subtracting the dead time from the output change time.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
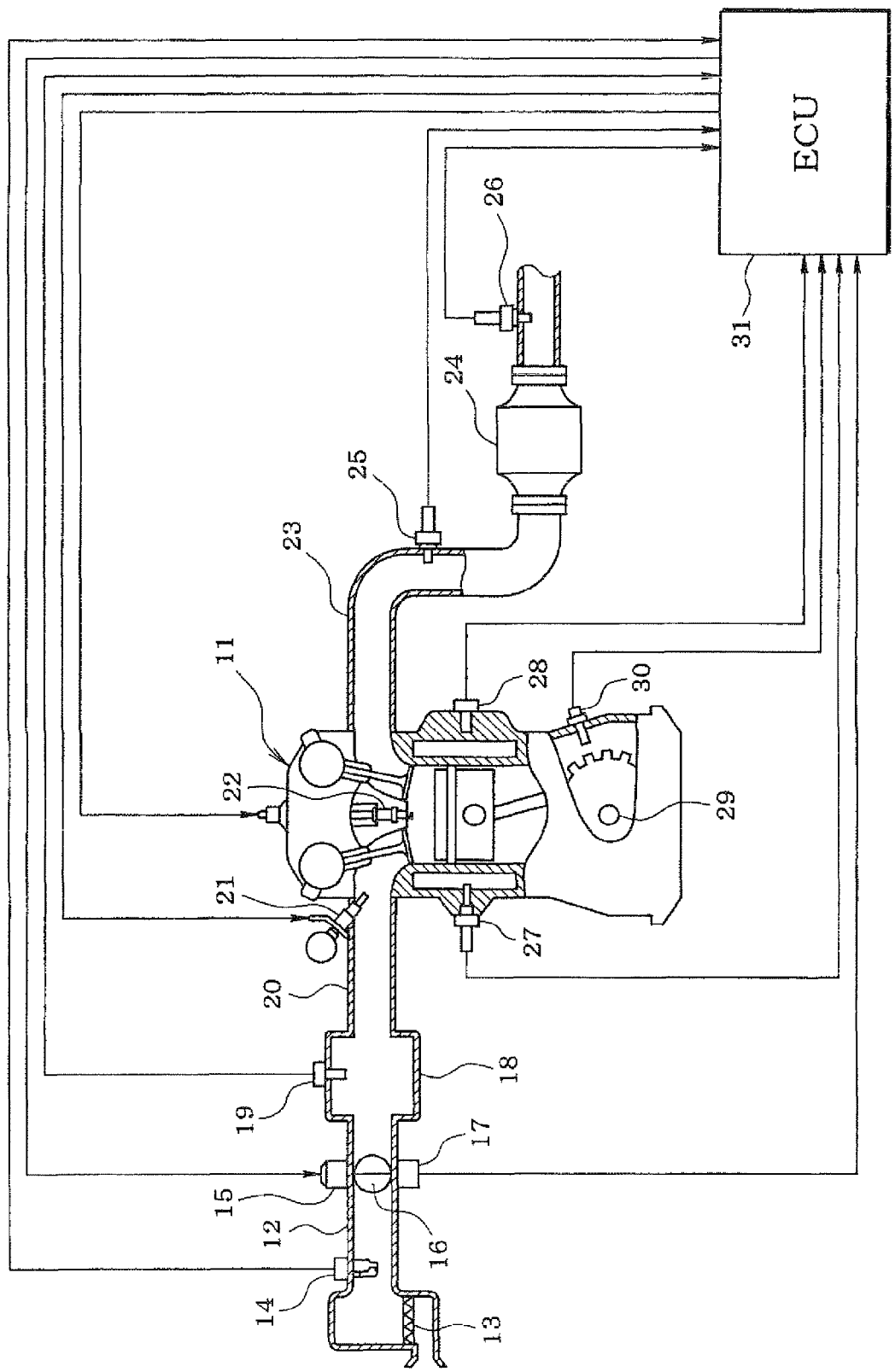
FIG. 1 is a general construction diagram showing an entire engine control system in one embodiment of the present invention.

First, a general construction of an entire engine control system will be described with reference to FIG. 1. An internal combustion engine 11 has an air cleaner 13 provided in the most upstream portion of an intake pipe 12 thereof. An air flow meter 14 is provided on the downstream side of the air cleaner 13 for detecting an amount of intake air. A throttle valve 16 and a throttle position sensor 17 are provided on the downstream side of the air flow meter 14. The throttle valve 16 has a motor 15 for controlling a throttle position corresponding to an opening thereof. The throttle position sensor 17 detects the throttle position of the throttle valve 16. Further, a surge tank 18 is provided on the downstream side of the throttle valve 16. The surge tank 18 is provided with an intake pipe pressure sensor 19 for detecting pressure (intake pipe pressure) in the intake pipe. Moreover, the surge tank 18 is provided with an intake manifold 20 for introducing air into each cylinder of the engine 11. A fuel injection valve 21 is fixed to a portion close to the intake port of the intake manifold 20 of the each cylinder for injecting fuel. Moreover, the cylinder head of the engine 11 is mounted with an ignition plug 22 for each cylinder. An air-fuel mixture in the cylinder is ignited by spark discharge of the each ignition plug 22. The exhaust pipe 23 of the engine 11 is provided with a catalyst 24 such as a three-way catalyst for purifying exhaust gas. An exhaust gas sensor 25 such as an air-fuel ratio sensor or an oxygen sensor is provided on the upstream side of the catalyst 24 for detecting the air-fuel ratio or rich/lean state of the exhaust gas. An oxygen sensor (catalyst downstream sensor) 26 is provided on the downstream side of the catalyst 24 for detecting the rich/lean state of the exhaust gas.

The cylinder block of the engine 11 is mounted with a cooling water temperature sensor 27 for detecting a cooling water temperature and a knock sensor 28 for detecting vibration caused by knocking. Further, a crankshaft 29 has a crank angle sensor 30 fixed on the outer peripheral side thereof. The crank angle sensor 30 outputs a pulse signal every time the crankshaft 29 rotates by a predetermined crank angle. A crank angle and an engine revolution speed are detected on the basis of the output signal of the crank angle sensor 30. The outputs of the present various kinds of sensors are inputted to an engine control unit (ECU) 31. The ECU 31 is constructed of a microcomputer as a main body for executing various engine control programs stored in a built-in ROM (storage medium) so as to control the fuel injection quantity of the fuel injection valve 21 and the ignition timing of the ignition plug 22 according to the operating state of the engine 11. Moreover, the ECU 31 executes processings for diagnosing a malfunction caused in the catalyst downstream sensor 26 shown in FIG. 3 and FIG. 4, which will be described later, thereby performing the malfunction diagnosis of the catalyst downstream sensor 26 in the following manner.

Figure 2:
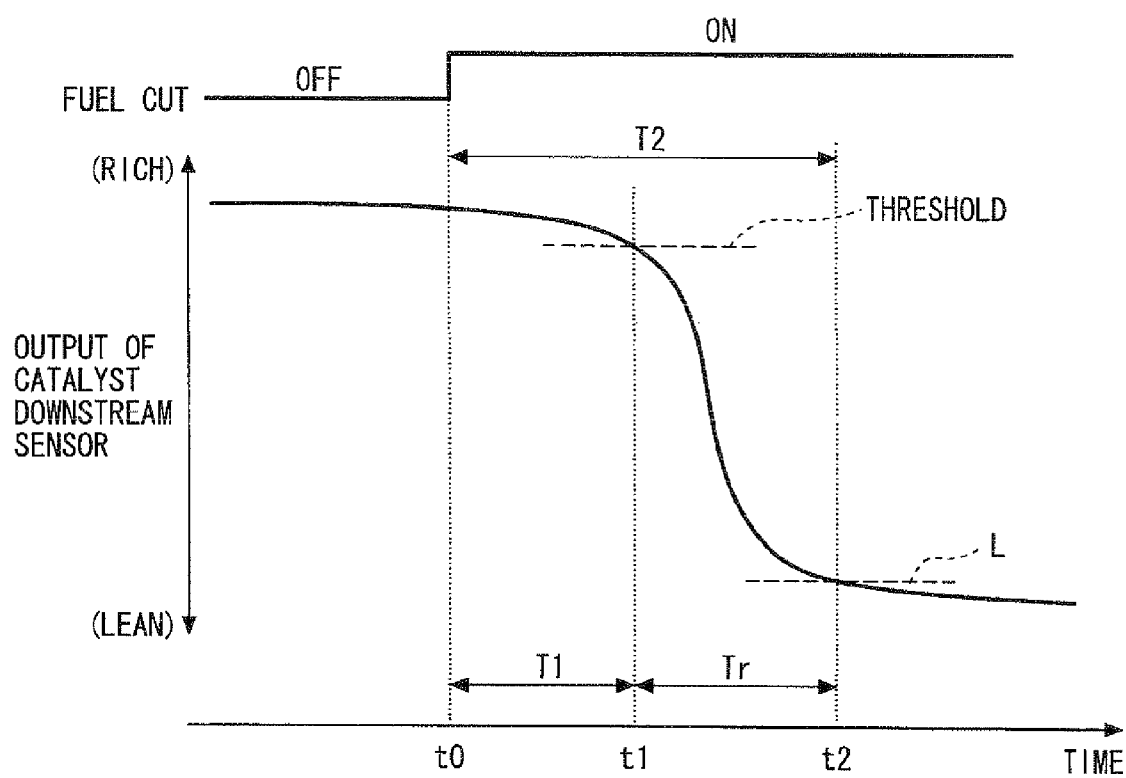
FIG. 2 is a time chart showing an example of performing a malfunction diagnosis of a catalyst downstream sensor.

As shown by the time chart shown in FIG. 2, the ECU 31 calculates a dead time T1 between the time point (first time point) t0 and the time point (second time point) t1. At the time point t0, fuel cut of the engine 11 is started. At the time point t1, the fuel cut starts to exert an effect on the output of the catalyst downstream sensor 26. Moreover, the ECU 31 measures an output change time T2, which elapses after the time point t0, at which the fuel cut is started, until the time point (third time point) t2 at which the output of the catalyst downstream sensor 26 changes to a leaner side than a threshold (predetermined lean determination value) L.

As follows, the method for calculating the dead time T1 will be described. First, the ECU 31 obtains an integrated amount of intake air Vg that is a summation of an amount of intake air from the time point, at which the fuel cut is started, to the time point at which the output of the catalyst downstream sensor 26 changes to the leaner side than a predetermined threshold. The present predetermined threshold is a value determined to be slightly leaner than the output of the catalyst downstream sensor 26 before the start of the fuel cut (fuel cut start), for example. Thus, the ECU 31 obtains an integrated exhaust gas amount Vg, which is a summation of an exhaust gas amount from the time point, at which the fuel cut is started, to the time point at which the fuel cut starts to exert an effect on the output of the catalyst downstream sensor 26. The integrated exhaust gas amount Vg is information reflecting an average exhaust gas flow rate (exhaust gas amount flowing per unit time) from the time point, at which the fuel cut is started, to the time point at which the fuel cut starts to exert an effect on the output of the catalyst downstream sensor 26. Subsequently, the ECU 31 multiplies a value, which is obtained by dividing a passage volume V from an injection valve position, at which the fuel injection valve 21 of the engine 11 is mounted, to a gas sensor position, at which the catalyst downstream sensor 26 is mounted, by the integrated exhaust gas amount Vg, by a predetermined factor, thereby obtaining the dead time T1.

Dead time $T1 = (V/Vg) \times$ factor

Here, the passage volume V is determined by the position, at which the fuel injection valve 21 is mounted, the position, at which the catalyst downstream sensor 26 is mounted, the displacement of the engine 11, the inner diameter of the exhaust pipe 23, the volume of the catalyst 24, and the like. The ECU 31 obtains the dead time T1 and the output change time T2 in this manner, and then obtains the time by subtracting the dead time T1 from the output change time T2 as the response time Tr of the catalyst downstream sensor 26. Subsequently, the ECU 31 compares the response time Tr with a malfunction determination value. As a result, when it is determined that the response time Tr is larger than the malfunction determination value, it is determined that the catalyst downstream sensor 26 is abnormal due to malfunction, and responsivity of the catalyst is lowered due to deterioration. In contrast, when it is determined that the response time Tr is not larger than the malfunction determination value, it is determined that the catalyst downstream sensor 26 is not abnormal (normal).

Hereinafter, the processings for diagnosing a malfunction caused in the catalyst downstream sensor 26 will be described with reference to FIG. 3 and FIG. 4. The present processings are executed by the ECU 31.

[Catalyst Downstream Sensor Malfunction Diagnosis Processing]

Figure 3:
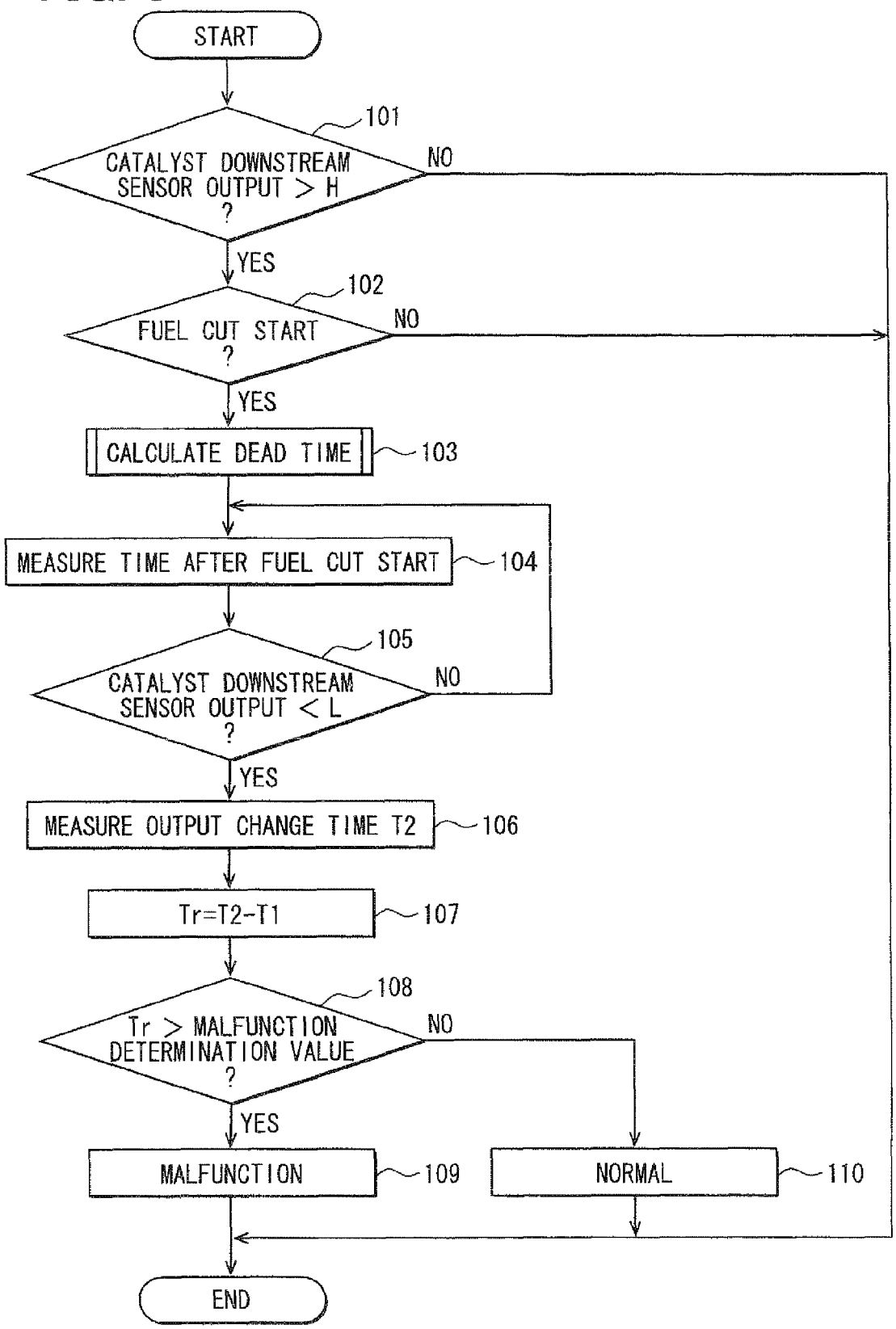
FIG. 3 is a flowchart showing the flow of the processing of a catalyst downstream sensor malfunction diagnosis processing.

A catalyst downstream sensor malfunction diagnosis processing shown in FIG. 3 is executed at predetermined intervals while the ECU 31 is energized and activated. When the present processing is started, first, it is determined in step 101 whether the output of the catalyst downstream sensor 26 in advance of the fuel cut start is larger than a predetermined value H, i.e., whether the output of the catalyst downstream sensor 26 is on a rich side. The predetermined value H is set to a value larger than a lean determination value L, i.e., the predetermined value H is set on a rich side with respect to the lean determination value L. When it is determined in step 101 that the output of the catalyst downstream sensor 26 in advance of the fuel cut start is not larger than the predetermined value H, i.e., the output is on a leaner side than the predetermined value H, it is determined that the response time Tr of the catalyst downstream sensor 26 cannot be detected with high accuracy because the output of the catalyst downstream sensor 26 is already close to the lean determination value L. In this case, the processing subsequent to step 102 is not performed, but the present processing is terminated. On the other hand, when it is determined in step 101 that the output of the catalyst downstream sensor 26 in advance of the fuel cut start is larger than the predetermined value H, i.e., the output is on a rich side, the processing proceeds to step 102 where it is determined whether the fuel cut is started. When it is determined that the fuel cut is started in step 102, the processing proceeds to step 103. In step 103, a dead time calculation processing shown in FIG. 4, which will be described later, is executed, whereby the dead time T1 is calculated. The dead time T1 is the time that elapses after the fuel cut start until the fuel cut starts to exert an effect on the output of the catalyst downstream sensor 26.

Subsequently, the processing proceeds to step 104 where a time measuring operation is executed by using a timer for measuring the time that elapses after the fuel cut start. Subsequently, the processing proceeds to step S105 where it is determined whether the output of the catalyst downstream sensor 26 is smaller than the lean determination value L, i.e., the output of the catalyst downstream sensor 26 is on a lean side. When it is determined that the output of the catalyst downstream sensor 26 is smaller than the lean determination value L, the processing proceeds to step 106. In step 106, the output change time T2, which is the time that elapses after the fuel cut start until the output of the catalyst downstream sensor 26 changes to a leaner side than the lean determination value L, is measured on the basis of the measurement value of the timer. The processing from steps 104 to 106 functions as output change time measurement means.

Subsequently, the processing proceeds to step 107 where the dead time T1 is subtracted from the output change time T2, whereby the response time Tr of the catalyst downstream sensor 26 is obtained.

$$Tr=T2-T1$$

Thereafter, the processing proceeds to step 108 where it is determined whether the response time Tr is larger than a malfunction determination value. When it is determined that the response time Tr is larger than the malfunction determination value, the processing proceeds to step 109. In step 109, the catalyst downstream sensor 26 is determined to be abnormal due to causing a malfunction, and responsivity of the catalyst is lowered due to deterioration. Further, in step 109, a malfunction flag is set ON, and an alarm lamp (not shown) provided in the instrument panel of an occupant's seat is lit, or an alarm is displayed on an alarm display portion (not shown) of the instrument panel of the occupant's seat to give an alarm to the occupant. Further, in step 109, the present alarm information such as a malfunction code is stored in a rewritable non-volatile memory. The rewritable non-volatile memory may be a rewritable memory for storing data even while the ECU 31 is de-energized. More specifically, the rewritable non-volatile memory may be a backup RAM of the ECU 31, for example. Thus, the present processing is terminated. In contrast, when it is determined in step 108 that the response time Tr is not larger than the malfunction determination value, the processing proceeds to step 110 where the catalyst downstream sensor 26 is determined to be not abnormal (normal) and where the alarm flag is maintained OFF. Subsequently, the present processing is terminated. The processing from step 107 to step 110 functions as malfunction determination means.

[Dead Time Calculation Processing]

Figure 4:
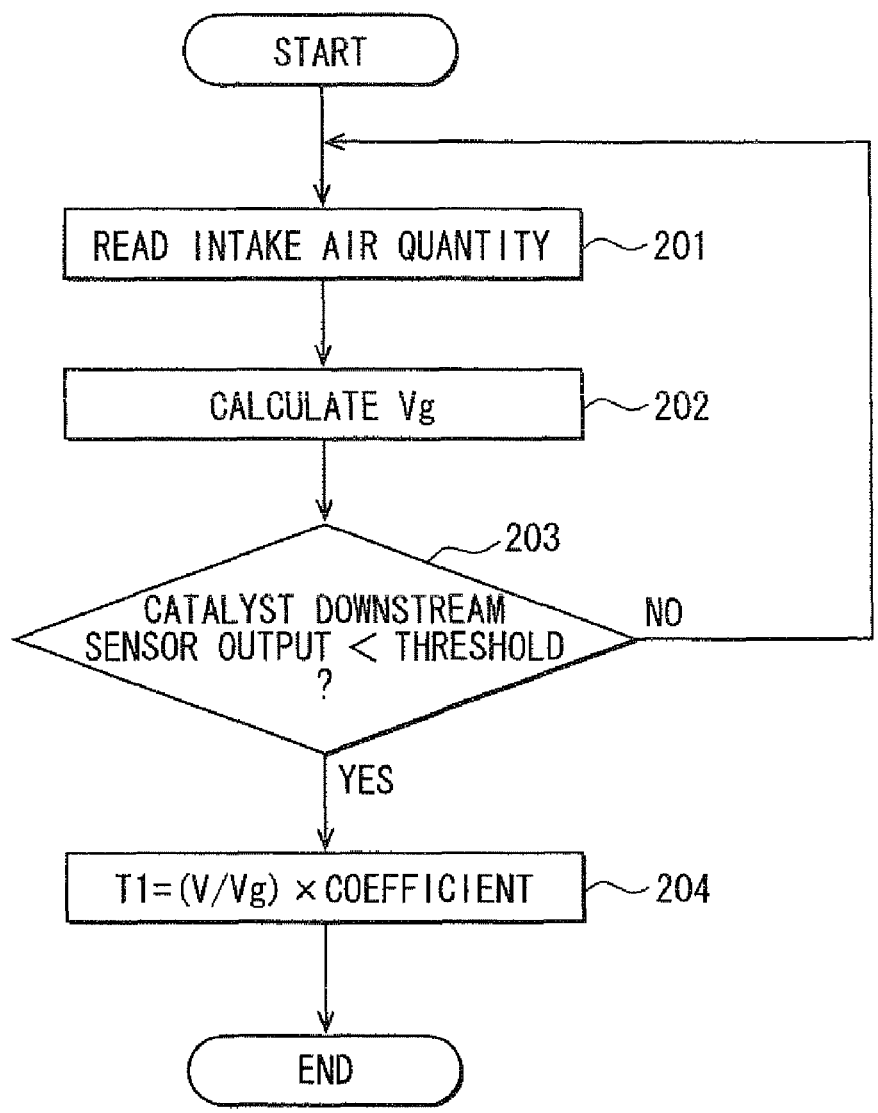
FIG. 4 is a flowchart showing the flow of the processing of a dead time calculation processing.

A dead time calculation processing shown in FIG. 4 is a subroutine executed in step 103 of the catalyst downstream sensor malfunction diagnosis processing shown in FIG. 3 and functions as dead time determination means. When the present processing is started, first, in step 201, an amount of intake air (volume) detected on the basis of the output of the air flow meter 14 is read. Subsequently, the processing proceeds to step 202 where the present amount of intake air is added to an integrated amount of intake air after the fuel cut start, whereby the integrated intake air amount Vg after the fuel cut start is updated. Thereafter, the processing proceeds to step 203 where it is determined whether the output of the catalyst downstream sensor 26 changes to a lean side in accordance with determination whether the output of the catalyst downstream sensor 26 is smaller than a threshold, i.e., whether the output is on a lean side. For example, the present threshold is set to a value on a slightly leaner side than the output of the catalyst downstream sensor 26 in advance of the fuel cut start. When it is determined in step 203 that the output of the catalyst downstream sensor 26 does not change to the lean side, the processing returns to step 201. Thus, steps 201, 202 where the processing of adding the present amount of intake air to the integrated intake air amount to update the integrated intake air amount Vg after the fuel cut start is repeated until it is determined that the output of the catalyst downstream sensor 26 changes to the lean side. In this manner, the integrated intake air amount Vg from the time point, at which the fuel cut is started, to the time point at which the fuel cut starts to exert an effect on the output of the catalyst downstream sensor 26 is obtained. Thus, the integrated exhaust gas amount Vg from the time point, at which the fuel cut is started, to the time point at which the fuel cut starts to exert an effect on the output of the catalyst downstream sensor 26 is obtained. Thereafter, when it is determined in step 203 that the output of the catalyst downstream sensor 26 changes to the lean side, the processing proceeds to step 204. In step 204, the value, which is obtained by dividing the passage volume V by the integrated exhaust gas amount Vg, is multiplied by a predetermined factor. The passage volume V corresponds to the volume from the position at which the fuel injection valve 21 of the engine 11 is mounted to the position at which the catalyst downstream sensor 26 is mounted. Thus, the dead time T1 is obtained.

Dead time $T1=(V/Vg) \times \text{factor}$

In this regard, in the dead time calculation processing shown in FIG. 4, the integrated exhaust gas amount Vg is obtained by integrating the amount of intake air detected by the air flow meter 14. However, the integrated exhaust gas amount Vg may be calculated by obtaining an exhaust gas amount from a data map or the like according to one of or both the engine revolution speed and the engine load and by integrating the obtained exhaust gas amount. The engine load may include, for example, intake pipe pressure, throttle valve position, or the like.

In the present embodiment described above, the dead time T1, which elapses after the fuel cut start of the engine 11 until the fuel cut starts to exert an effect on the output of the catalyst downstream sensor 26, is calculated. Further, the output change time T2, which elapses after the fuel cut start until the output of the catalyst downstream sensor 26 changes to the leaner side than the lean determination value L, is measured. In addition, the dead time T1 is subtracted from the output change time T2 to obtain the response time Tr of the catalyst downstream sensor 26. Furthermore, the response time Tr is compared with the malfunction determination value to determine whether the catalyst downstream sensor 26 is abnormal due to causing malfunction, i.e., whether responsivity of the catalyst is lowered due to deterioration. Thus, the responsivity of the catalyst downstream sensor 26 can be evaluated with high accuracy without an effect of the dead time T1, so that whether the catalyst downstream sensor 26 is abnormal, i.e., whether responsivity of the catalyst is lowered due to deterioration can be determined with high accuracy. Hence, the detection accuracy of deterioration of responsivity of the catalyst downstream sensor 26 can be enhanced. In this regard, in the present embodiment, the dead time T1 is obtained on the basis of: the passage volume V from the position at which the fuel injection valve 21 of the engine 11 is mounted to the position at which the catalyst downstream sensor 26 is mounted; and the integrated exhaust gas amount Vg from the time point, at which the fuel cut is started, to the time point at which the fuel cut starts to exert an effect on the output of the catalyst downstream sensor 26. However, the method for determining the dead time T1 may be changed as appropriate. For example, the time, which elapses after the fuel cut start until the output of the catalyst downstream sensor 26 starts to change to the lean side, may be measured as a dead time.

Alternatively, the following method may be employed. Specifically, a gas traveling time, which is the time required for the gas to flow from the position at which the fuel injection valve 21 is mounted to the position at which the catalyst downstream sensor 26 is mounted, is obtained. The gas traveling time may be calculated on the basis of the passage volume V from the position at which the fuel injection valve 21 of the engine 11 is mounted to the position at which the catalyst downstream sensor 26 is mounted and the exhaust gas amount. Subsequently, a catalyst reaction time, which is the time that elapses after the air-fuel ratio of the gas flowing into the catalyst 24 starts to change because of the fuel cut until the air-fuel ratio of the gas flowing out of the catalyst 24 starts to change, is obtained. The catalyst reaction time may be calculated on the basis of the state of deterioration of the catalyst 24. The calculated catalyst reaction time is added to the gas traveling time to obtain a dead time. In other words, the gas traveling time can be obtained by dividing the passage volume V from the position at which the fuel injection valve 21 of the engine 11 is mounted to the position at which the catalyst downstream sensor 26 is mounted by the exhaust gas flow rate. The exhaust gas flow rate is the exhaust gas amount flowing per unit time. Moreover, according to the state of deterioration of the catalyst 24, the quantity of oxygen that the catalyst 24 can adsorb changes and hence the catalyst reaction time changes. Therefore, the catalyst reaction time can be obtained from the state of deterioration of the catalyst 24. The dead time is produced by the gas traveling time and the catalyst reaction time. Therefore, by adding the catalyst reaction time to the gas traveling time, the dead time can be obtained with high accuracy.

Moreover, in the above-mentioned embodiment, the oxygen sensor is arranged as the catalyst downstream sensor 26. Alternatively, an air-fuel ratio sensor may be provided as the catalyst downstream sensor 26.

The above processings such as calculations and determinations are not limited being executed by the ECU 31. The control unit may have various structures including the ECU 31 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A malfunction diagnosis apparatus for performing a malfunction diagnosis of an exhaust gas sensor, which is for detecting at least one of an air-fuel ratio and a rich-lean state and provided on a downstream side of a catalyst, which is for purifying exhaust gas of an internal combustion engine, the malfunction diagnosis apparatus comprising:

dead time determination means for determining a dead time between a first time point, at which fuel cut of the internal combustion engine is started, and a second time point, at which the fuel cut starts exerting effect on an output of the exhaust gas sensor;

output change time measurement means for measuring an output change time between the first time point and a third time point, at which the output of the exhaust gas sensor changes to a leaner side than a threshold; and malfunction determination means for determining whether a malfunction is caused in the exhaust gas sensor on the basis of a response time of the exhaust gas sensor obtained by subtracting the dead time from the output change time.

2. The malfunction diagnosis apparatus according to claim 1,
wherein the dead time determination means determines the dead time on the basis of:
a passage volume between an injection valve position, at which a fuel injection valve of the internal combustion engine is located, and a gas sensor position, at which the exhaust gas sensor is located; and
a summation of an amount of exhaust gas in the dead time.

3. The malfunction diagnosis apparatus according to claim 1,
wherein the dead time determination means calculates the dead time on the basis of:
a passage volume between an injection valve position, at which a fuel injection valve of the internal combustion engine is located, and a gas sensor position, at which the exhaust gas sensor is located; and
a summation of an amount of intake air in the dead time.

4. The malfunction diagnosis apparatus according to claim 2, wherein the dead time determination means obtains the amount of exhaust gas on the basis of at least one of a revolution speed of the internal combustion engine and a load of the internal combustion engine.

5. The malfunction diagnosis apparatus according to claim 1, wherein the dead time determination means measures a time period, which is between the first time point and a time point, at which the output of the exhaust gas sensor starts to change to a lean side, as the dead time.

6. The malfunction diagnosis apparatus according to claim 1,
wherein the dead time determination means calculates a gas traveling time, which is required for gas to flow from a injection valve position, at which a fuel injection valve of the internal combustion engine is located, to a gas sensor position, at which the exhaust gas sensor is located, on the basis of:
a passage volume between the injection valve position and the gas sensor position; and
a flow rate of exhaust gas,
wherein the dead time determination means calculates a catalyst reaction time, which is between a time point, at which an air-fuel ratio of gas flowing into the catalyst changes because of the fuel cut, and a time point, at which an air-fuel ratio of gas flowing out of the catalyst starts to change, on the basis of a state of deterioration of the catalyst,
wherein the dead time determination means obtains the dead time by adding the catalyst reaction time to the gas traveling time.

7. A method for diagnosing a malfunction of an exhaust gas sensor, which is for detecting at least one of an air-fuel ratio and a rich-lean state and provided on a downstream side of a catalyst, which is for purifying exhaust gas of an internal combustion engine, the method comprising:

first determining a dead time between a first time point, at which fuel cut of the internal combustion engine is started, and a second time point, at which the fuel cut starts exerting effect on an output of the exhaust gas sensor;
measuring an output change time between the first time point and a third time point, at which the output of the exhaust gas sensor changes to a leaner side than a threshold; and
second determining whether a malfunction is caused in the exhaust gas sensor on the basis of a response time of the exhaust gas sensor obtained by subtracting the dead time from the output change time.

8. The method according to claim 7, wherein the first determining includes:
determining the dead time on the basis of:
a passage volume between an injection valve position, at which a fuel injection valve of the internal combustion engine is located, and a gas sensor position, at which the exhaust gas sensor is located; and
a summation of an amount of exhaust gas in the dead time.

9. The method according to claim 7, wherein the first determining includes:
determining the dead time on the basis of:
a passage volume between an injection valve position, at which a fuel injection valve of the internal combustion engine is located, and a gas sensor position, at which the exhaust gas sensor is located; and
a summation of an amount of intake air in the dead time.

10. The method according to claim 8, wherein the first determining further includes:
obtaining the amount of exhaust gas on the basis of at least one of a revolution speed of the internal combustion engine and a load of the internal combustion engine.

11. The method according to claim 7, wherein the first determining further includes:
measuring a time period, which is between the first time point and a time point, at which the output of the exhaust gas sensor starts to change to a lean side, as the dead time.

12. The method according to claim 7,
wherein the first determining includes:
first calculating a gas traveling time, which is required for gas to flow from a injection valve position, at which a fuel injection valve of the internal combustion engine is located, to a gas sensor position, at which the exhaust gas sensor is located, on the basis of:
a passage volume between the injection valve position and the gas sensor position; and
a flow rate of exhaust gas,
second calculating a catalyst reaction time, which is between a time point, at which an air-fuel ratio of gas flowing into the catalyst changes because of the fuel cut, and a time point, at which an air-fuel ratio of gas flowing out of the catalyst starts to change, on the basis of a state of deterioration of the catalyst; and
obtaining the dead time by adding the catalyst reaction time to the gas traveling time.

* * * * *